May 24, 1938.  H. GLAENZER  2,118,042
LOCOMOTIVE
Filed April 24, 1935
Fig.1
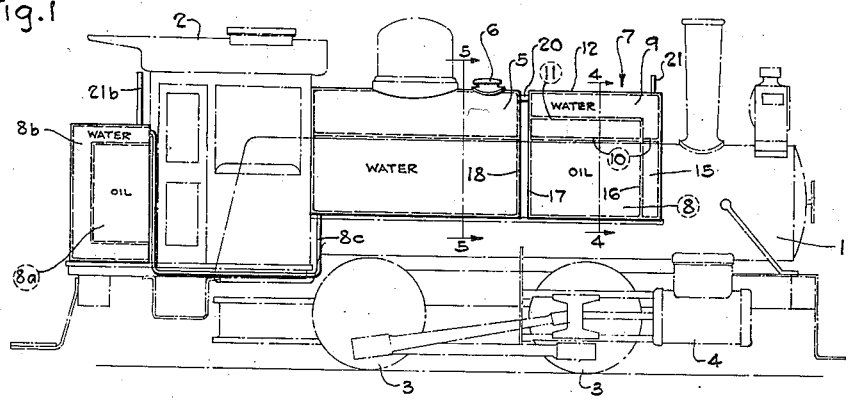
Fig.2
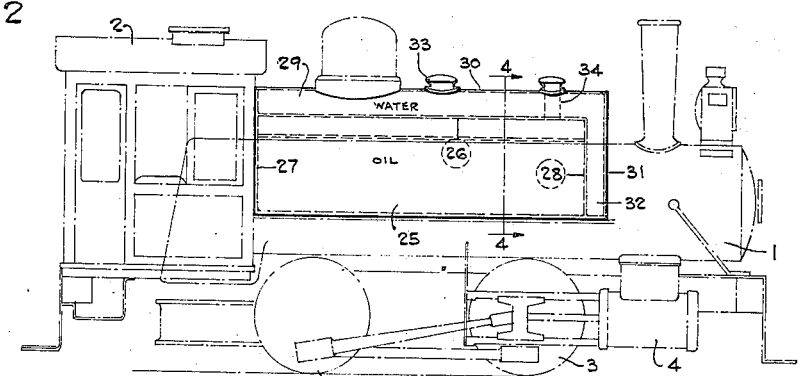
Fig.3
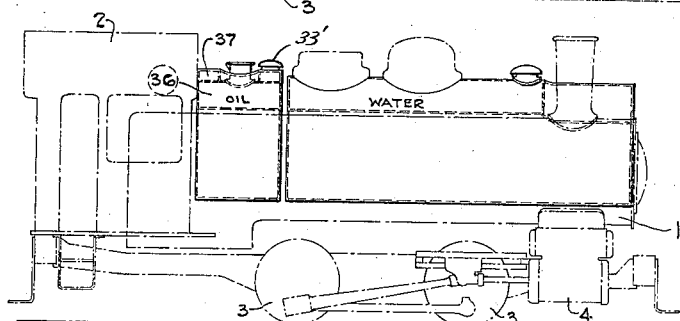
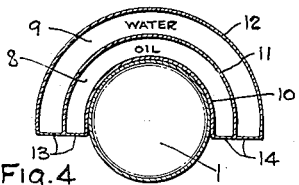
Fig.4
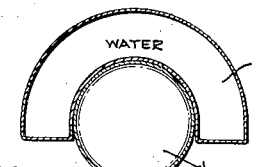
Fig.5  Fig.6
INVENTOR
Harry Glaenzer
BY
ATTORNEY Patented May 24, 1938

2,118,042

UNITED STATES PATENT OFFICE 2,118,042

LOCOMOTIVE

Harry Glaenzer, Philadelphia, Pa.

Application April 24, 1935, Serial No. 18,001

9 Claims. (Cl. 105—43)

This invention relates generally to oil-fired locomotives and more particularly to an improved combination for storing fuel oil safely and in a minimum space and at the same time permitting moderate warming of the oil while in its storage tank.

The locomotive herein disclosed is particularly applicable to switching service. For a number of years there has been a strong demand for switching locomotives which are economical in operation and have considerable tractive effort and power together with a high degree of compactness and relatively low initial cost. The Diesel engine type switching locomotive has been developed over a period of time in an attempt to meet this demand, but such locomotives not only have a relatively high initial cost but they are in addition relatively complicated compared to steam locomotives notwithstanding the advantages incident to the use of fuel oil in the Diesel engines.

It is one object of my invention to provide an improved oil-fired steam switching locomotive that will be economical in initial cost, operation and maintenance and that will have a high degree of compactness, efficiency of operation and tractive effort. A further object is to provide improved means for storing the fuel oil so as to improve not only the fuel consumption and efficiency of operation but also to improve the tractive effort while still providing a highly compact locomotive.

I have accomplished the foregoing objects by providing in one specific aspect of the invention an improved saddleback fuel tank disposed in an improved cooperative relation to a saddleback water tank together with a water jacket disposed around the outside of the fuel tank in superimposed saddleback relation thereto, whereby the water tank and water jacket function to provide a simple and economical means for providing an appreciable body of moderate heat to maintain the oil warm at a substantially uniform temperature for a considerable period of time. The foregoing desirable results are obtained together with the further advantage that the cooperating water jackets provide a very effective insulation for the fuel oil against external sources of intense heat such as is sometimes encountered around steel mills. All of these results are obtained while still maintaining a structure of low initial cost and economical maintenance and operation together with a high degree of compactness and tractive effort.

Other objects and advantages will be more apparent to those skilled in the art from the following description of the accompanying drawing in which:

Fig. 1 is a side elevation of a locomotive embodying my improved combination;

Fig. 2 is a modification of the invention employing a longitudinally extended oil tank;

Fig. 3 is a further modification of the invention wherein the oil tank is disposed adjacent the cab and the water tank disposed at the outer end of the boiler;

Fig. 4 is a transverse section showing the relation of the oil tank with respect to the surrounding water space, taken substantially on the lines 4—4 of Figs. 1 and 2;

Fig. 5 is a transverse section taken substantially on line 5—5 of Fig. 1;

Fig. 6 is a further modification wherein the oil tank is extended longitudinally as in Fig. 2 but extends only over one-quarter of the boiler in a circumferential direction, the fuel tank and another quarter of the boiler being surrounded by the water tank.

In the particular embodiments of the invention which are disclosed herein merely for the purpose of illustrating certain specific forms among possible others that the invention might take in practice, I have shown in Fig. 1 a locomotive having a boiler 1 and cab 2 mounted upon driving wheels 3 which are preferably driven in the usual manner from steam piston and cylinders 4. The details of construction of the locomotive per se and accessories such as water pumps, burner equipment, etc., do not constitute a part of my present invention. Mounted upon the boiler is a suitable saddleback water tank 5 having a usual water filling inlet 6. Also disposed on the boiler 1 is a saddleback tank generally indicated at 7 having superimposed arcuate chambers, one of which is in saddleback relation to the other. The inner one of these chambers generally indicated at 8 is used for fuel oil while the outer superimposed tank or compartment generally indicated at 9 has water or other desired liquid disposed therein. As indicated in Fig. 4, the fuel tank 8 is formed preferably between concentric walls 10 and 11 while the water tank is formed between wall 11 and wall 12 preferably concentric therewith. The lower radial portion of these tanks is closed by radial walls 13 and 14. The water compartment also has an end leg generally indicated at 15 which overlaps an end wall 16 of the oil compartment, the other end wall 17 being disposed adjacent the end wall 18 of the main water tank 5.

The liquid compartment surrounding the oil tank may be filled in any suitable manner, but as shown in Fig. 1 if it is filled with water this is preferably accomplished automatically upon filling of the main water tank. A pipe connection 20 connects the uppermost regions of main tank 5 and water compartment 9 whereby upon filling of the main water tank through inlet 6 the water after first filling the main tank will then flow through pipe 20 to fill the water compartment. A suitable vent pipe 21 is provided in the water compartment to prevent the same becoming airbound. In addition to automatic filling of the water compartment, it will be noted that due to the high position of pipe connection 20 the water cannot flow under normal conditions from the water compartment back into the main water tank although it is obvious that if the grade of the track is sufficiently great, then a small amount of water may flow from the water compartment into the main water tank. However, the interconnection such as 20 has a sufficiently high elevation to substantially prevent such return flow for all normal conditions of operation. Hence throughout operation the fuel oil will be surrounded by water irrespective of the level of the water in the main tank. It will be noted from Figs. 1, 4, and 5 that the main water tank 5 has preferably substantially the same outer radius as the oil tank and its water compartment. These tanks may be suitably supported by brackets or otherwise in close juxtaposition to the boiler shell and its lagging whereby heat radiated from the boiler will effectively warm the fuel oil and ultimately cause warming of the water in the water compartment. This warmed water will insure uniform temperature throughout the whole body of oil and will also tend to maintain such uniform temperature over an appreciable period of time such as when the locomotive is temporarily idle. In addition the water in said compartment will not only protect the fuel oil from any external source of intense heat but the water will absorb a certain amount of such heat and thereby assist in maintaining the oil at its uniform temperature which is conducive to improved combustion efficiency of the oil burner apparatus. As shown in Fig. 1, the oil compartment 8a may be disposed at any other suitable location on the locomotive and surrounded by a water jacket 8b. Automatic filling thereof is accomplished by a pipe 8c connected into a lower portion of the main water tank, and the water compartment has a vent 21b.

In the modification shown in Fig. 2, the oil tank generally indicated at 25 is provided with concentric walls, the upper one of which is indicated at 26, and end walls 27 and 28. This tank is suitably supported over the boiler and extends for an appreciable longitudinal distance thereof. A combined main water tank and water compartment for the fuel tank is provided as generally indicated at 29. This combined tank has an outer wall 30 preferably concentric with the inner wall 26 and is provided with an end wall 31 spaced from wall 28, thereby providing an end water leg 32. It will be understood that the end walls 27, 28, and 31 are arcuately formed. Fig. 4 is representative of the type of cross-section of the fuel tank and the combined main water tank and fuel water compartment. This combined tank may be provided with any suitable water filling inlet 33 while an oil filling and indicating pipe 34 may extend upwardly from oil tank 25 through the wall 30 of the water compartment, thereby to permit the oil level to be readily determined. This modification has all the advantages as hereinbefore set forth, and hence further review thereof is not deemed necessary.

In the modification of Fig. 3, the fuel oil tank 36 is disposed adjacent the cab 2 while the main water tank extends from the fuel tank outwardly toward the other end of the boiler. It will be noted, however, that the fuel tank in this case is provided only with a radially superimposed tank or compartment generally indicated at 37 for water or other desired liquid, there being no annular or end compartment leg such as 15 or 32 in Figs. 1 and 2. This leg is effectively eliminated due to the close juxtaposition of the fuel tank to the main water tank which thereby performs the function of the end water leg in the same manner that the main water tank performs such a function for the left end of the fuel tank as shown in Fig. 1. The cab ends of the fuel tanks in both Figs. 2 and 3 are amply protected by their relative close juxtaposition to the general cab structure. Water tank 37 may be filled through a suitable inlet 33'.

In the modification of Fig. 6, the same general arrangement of Fig. 2 is employed except that the longitudinal fuel tank 40 extends circumferentially over one-quarter of the boiler, the water tank extending over another quarter of the boiler and over the fuel tank.

From the foregoing disclosures and the several modifications, it is seen that I have provided an extremely simple, compact and effective combination having many desirable structural and functional results as hereinbefore pointed out and is conducive to the provision of an oil-fired locomotive having a low initial cost together with a high degree of tractive effort and efficient fuel consumption, all of which factors are believed to be considerably more favorable than the Diesel powered locomotives of the same capacity.

It will of course be understood that various changes in details of construction and arrangement of parts may be made by those skilled in the art without departing from the spirit of the invention as set forth in the appended claims.

I claim:

1. The combination in an oil-fired steam locomotive comprising a boiler, a water tank and a fuel tank adjacent thereto and both disposed in saddleback relation to the boiler, and means forming a liquid compartment disposed in saddleback relation to the fuel tank.

2. The combination set forth in claim 1 further characterized by the provision of means forming an end leg of said liquid compartment, said end leg overlapping the end of the fuel tank.

3. The combination in an oil fired steam locomotive comprising a boiler, a water tank and a fuel tank adjacent thereto and both disposed in saddleback relation to the boiler, means forming a water tank disposed in saddleback relation to the fuel tank, and means whereby upon filling one of said water tanks the other thereof is automatically filled therefrom.

4. The combination in an oil fired steam locomotive comprising a boiler, a water tank and a fuel tank adjacent thereto and both disposed in saddleback relation to the boiler, means forming a water compartment disposed in saddleback relation to the fuel tank, and means for automatically filling said water compartment with water from said water tank but substantially preventing reverse flow from the compartment to the tank during use of water therefrom.

5. The combination set forth in claim 1 further characterized in that said water tank is disposed adjacent the locomotive cab, and the fuel tank and the liquid compartment are disposed adjacent the end of said water tank which is remote from the cab.

6. The combination in an oil-fired steam locomotive comprising a boiler, a fuel oil tank disposed in saddleback relation to the boiler, and means forming a water space in juxtaposition to said fuel tank and in saddleback relation to said boiler.

7. The combination set forth in claim 6 further characterized by the provision of an end leg for the water space, said end leg overlapping the end of the oil tank.

8. The combination in an oil-fired steam locomotive comprising a boiler, a fuel oil tank longitudinally supported thereon for at least a portion of the circumference thereof, and means forming a saddleback water tank overlying said fuel tank and boiler.

9. The combination set forth in claim 1 further characterized in that said fuel tank is disposed adjacent the locomotive cab and the water tank extends from said fuel tank toward the forward end of the boiler.

HARRY GLAENZER.